H. L. KIMMELL.
SHOCK ABSORBER.
APPLICATION FILED JAN. 25, 1916.
1,204,361.
Patented Nov. 7, 1916.
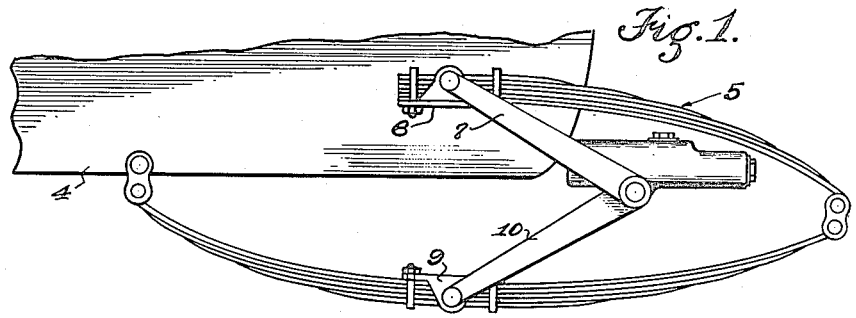
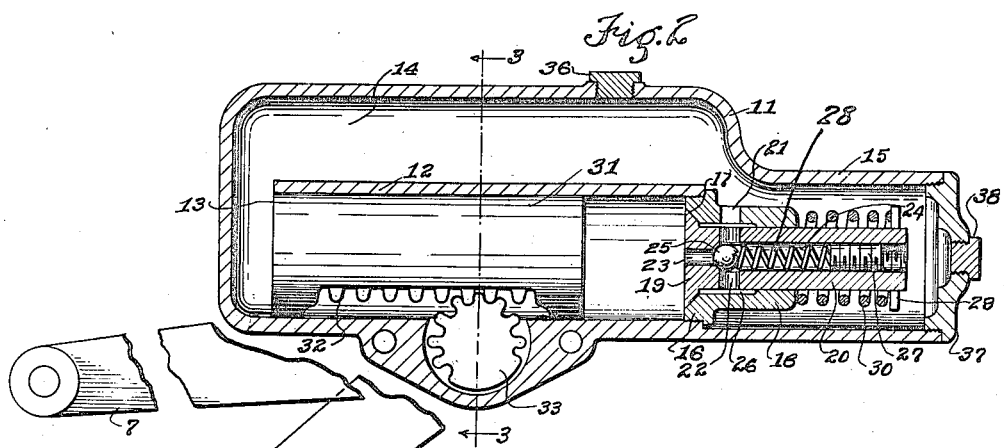
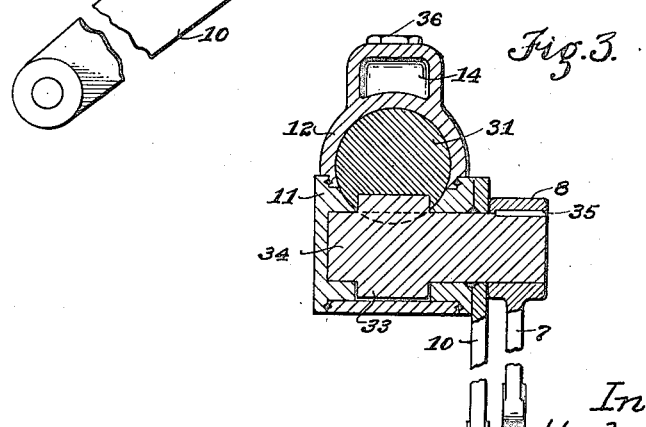
Inventor.
Herbert L. Kimmell.
By Edmund A. Strauss,
Atty.

UNITED STATES PATENT OFFICE.

HERBERT L. KIMMELL, OF LOS ANGELES, CALIFORNIA.

SHOCK-ABSORBER.

1,204,361.

Specification of Letters Patent.　　Patented Nov. 7, 1916.

Application filed January 25, 1916. Serial No. 74,120.

*To all whom it may concern:*

Be it known that I, HERBERT L. KIMMELL, a citizen of the United States, residing at Los Angeles, in the county of Los Angeles, State of California, have invented new and useful Improvements in Shock-Absorbers, of which the following is a specification.

This invention relates to a shock absorber, and pertains especially to a shock absorber of the hydraulic type.

It is an object of this invention to provide a shock absorber which will operate to permit substantially unrestrained movement in one direction, and will check the movement in the opposite direction.

It is a further object of this invention to provide a shock absorber in which the movement of a resisting piston may be divided or multiplied with respect to the movement of the bodies between which the shock is absorbed.

It is a still further object of this invention to provide a shock absorber of the hydraulic type which is so arranged that there is substantially no leakage and the moving parts are entirely closed.

I accomplish these objects by means of the embodiment of my invention illustrated in the accompanying drawing, in which:

Figure 1 is a side elevation of a fragment of a vehicle body and supporting springs attached thereto with my shock absorber disposed in position. Fig. 2 is an enlarged elevation partly in section of my improved shock absorber. Fig. 3 is a section as seen on the line 3—3 of Fig. 2.

I have shown my shock absorber applied to an automobile, a fragment of the body being indicated by 4, and a three-quarter elliptic spring by 5. The construction just described is that of a common and well known type of automobile chassis.

Pivotally secured to the upper spring seat 6 is an arm 7 provided with a hub 8 adapted to receive a shaft. Pivotally secured to the lower spring seat 9 is an arm 10 provided with an aperture through which a shaft is adapted to extend.

Fixedly secured to the arm 10 is a casing 11 which comprises a cylinder 12 open at one end as indicated at 13, and having a conduit extending the length of the cylinder, as indicated at 14. The casing 11 and the cylinder 12 are so arranged that fluid may pass from the open end of the cylinder 13 and into the conduit 14 to the other end of the cylinder. The casing 11 is extended beyond the front end of the cylinder and is reduced in diameter, as indicated at 15.

A head closes the forward end of the cylinder 12 and is comprised of a circular disk 16 having a ported valve seat 17, and an extension 18. Member 16 may be secured to the cylinder 12 by any convenient means, such as threads. A valve disk 19 having a stem 20 is arranged to coöperate with the seat 17, stem 20 extending through the extension 18. Ports are arranged radially about the reduced portion 18, one being indicated at 21. The valve disk 19 controls the flow of liquid to the right hand end of the cylinder 12. When the valve 19 lifts from its seat, fluid may flow through the port 21 and around the annular space 22 into the right hand end of the cylinder 12. Valve disk 19 has a port 23 which is enlarged in diameter at 24, providing a valve seat with which a ball 25 coöperates. Ports 26 extend radially through the stem 20 opening into the space 22. The end of the port 24 is threaded and a plug 27 inserted therein. Plug 27 abuts a spring 28, the other end of which rests upon the ball 25 so that by adjusting the plug 27 the pressure upon the ball 25 may be adjusted and the latter will open under a given pressure. Mounted on the end of stem 20 is a ring 29 which serves as an abutment for a spring 30, the other end thereof resting against the reduced portion 18 of the head. Spring 30 serves to hold the valve disk 19 upon its seat under normal conditions.

Mounted within the cylinder 12 for reciprocation is a piston 31. Piston 31 has on its side a rack 32 with which a pinion 33 engages so that by rotating pinion 33 piston 31 would be reciprocated. Pinion 33 may have its periphery covered for only a portion of its distance with teeth, and is preferably an integral part of a shaft 34 which is disposed in bearings formed in the casing 11. Shaft 34 extends at one side through the casing and through the aperture in arm 10, being keyed to the hub 8, as indicated at 35.

The casing 11 is filled with a liquid, preferably oil through an opening which is closed by a plug 35. A head 37 is threaded into the end of the casing 11 so that means is provided for removing the head 16 and its valves. The head 37 is also provided with an aperture closed by a plug 38. By removal of the plug 38 the plug 27 may be reached for adjustment.

Assuming that the shock absorber has been attached to an automobile as shown in Fig. 1, and the casing filled with oil and closed, movement of the body 14 toward the wheels will cause the arms 7 and 10 to move toward each other. This causes a relative movement of pinion 33 and a movement of the piston 31. In one direction of movement of the piston 31, that is, to the left, the oil will pass out through the opening 13 around through the conduit 14, through ports 21, space 22 and around the valve disk 19 into the right hand end of the chamber. The valve opening being large, there is a substantially unopposed movement of the liquid from the left hand end of the piston to the right. Upon movement of the piston in the opposite direction, valve 19 closes upon its seat and the liquid is trapped in the right hand end of the cylinder 12 between the piston 31 and the head 19. The pressure causes valve 25 to be lifted from its seat, and liquid passes out through ports 26, space 22 and ports 21 to conduit 14, and the left hand end of the cylinder. Due to the small size of port 23 there is a resistance to the movement of the piston and a shock is absorbed.

It is obvious that I have provided a shock absorber whose moving parts are entirely closed, and there is adjustability between the resistance to movement in one direction and the resistance to movement in the opposite direction. My absorber is also lubricated at all times and subject to practically no depreciation because of wear.

What I claim is:

1. A shock absorber, comprising in combination an arm adapted to be secured to one of two relatively movable members, a casing fixedly secured to said arm, a cylinder open at its ends mounted in said casing, a head for one end of said cylinder provided with a valve seat, an inwardly opening valve disk mounted on said seat provided with a hollow stem open to a port through said disk, a valve check for said last mentioned port, an arm adapted to be secured to the other of said members geared to said piston to reciprocate the latter.

2. A shock absorber, comprising in combination a cylinder, a conduit connecting the ends of said cylinder, a valve controlling said conduit having a reciprocating valve disk provided with a port, a check controlling said port, an arm fixedly secured to said cylinder, a piston having a rack mounted in said cylinder, a second arm secured to said cylinder for movement with respect thereto, and provided with a pinion meshing with said rack.

3. A shock absorber, comprising in combination a cylinder, a conduit connecting the ends of said cylinder, a valve controlling said conduit having a greater opening for flow of fluid in one direction than in the opposite direction, an arm fixedly secured to said cylinder, a piston having a rack mounted in said cylinder, a second arm secured to said cylinder for movement with respect thereto, and provided with a pinion meshing with said rack.

4. A shock absorber, comprising in combination a cylinder, a conduit connecting the ends of said cylinder, a valve controlling said conduit having a greater opening for flow of fluid in one direction than in the opposite direction, an arm fixedly secured to said cylinder, a piston in said cylinder, a second arm secured to said cylinder for movement with respect thereto and geared to said piston to move the latter.

In witness that I claim the foregoing I have hereunto subscribed my name this 12th day of January, 1916.

HERBERT L. KIMMELL.